3,817,885
REINFORCED CURABLE POLYMERIC
TRIAZINE COMPOSITIONS
Gordon H. Miller, Richmond, Va., assignor to
Texaco Inc., New York, N.Y.
No Drawing. Original application Sept. 1, 1971, Ser. No. 177,170. Divided and this application Mar. 23, 1973, Ser. No. 344,378
Int. Cl. C08g 51/04, 51/18
U.S. Cl. 260—9
9 Claims

ABSTRACT OF THE DISCLOSURE

Aliphatic nitriles having at least two —CN groups are polymerized by heating to a temperature of from about 80 to about 450° C. in the presence of a catalyst, such as a metal chloride, to form curable polymeric compositions which under the influence of heat and pressure can be converted to high strength, thermally stable, insoluble, infusible, polymeric materials, said materials containing a reinforcing agent.

---

This is a division, of application Ser. No. 177,170, filed Sept. 1, 1971, now Pat. 3,763,115.

BACKGROUND OF THE INVENTION

Field of the Invention

This invention relates to a process for polymerizing aliphatic nitriles having at least two cyano groups. More particularly, the invention relates to a process for preparing curable polymeric compositions by heating an aliphatic polynitrile in the presence of a catalyst. In another aspect, this invention relates to curable B-stage resin compositions prepared from aliphatic nitriles and to the cured products derived therefrom.

Description of the Prior Art

Johns in U.S. Pat. 3,164,555 has described the preparation of a variety of polymeric products from aliphatic dinitriles by heating, for example, perfluoroglutaronitrile, etc. at a pressure of at least 5,000 kg./sq. cm. and at a temperature above 200° C. in the presence of a catalytic amount of a nitrogeneous base or by heating the same monomers in the presence of certain metal halides, such as zinc chloride, etc. in a closed vessel at a temperature above 100° C. The perfluoronitrile polymers formed are useful as antifriction drive train elements. Perfluoroether dinitriles have also been homopolymerized or copolymerized with other perfluoroether dinitriles or perfluorodinitriles having from 2 to 8 carbon atoms between the nitrile groups, such as perfluorosuberodinitrile, to give easily fabricable resins with high resistance to corrosive chemicals which are good electrical insulators (see Fritz, U.S. Pat. 3,317,484).

Of the polymers described in the art, most of them are infusible hard resinous materials which cannot be fabricated by molding. There is a definite need in the art therefore for a process to provide curable B-stage polymers derived from aliphatic polynitriles which can be conveniently molded under, for example, heat and pressure.

BRIEF DESCRIPTION OF THE INVENTION

This invention relates to a process for preparing curable polymeric compositions by heating an aliphatic nitrile having at least two cyano groups in the presence of a catalyst at a temperature of about 80° to about 450- C. The polymeric compositions of this invention comprise recurring triazine rings linked together through alkylene groups joined to the carbon atoms of the said triazine rings. In another aspect, this invention relates to a method of curing the thus-obtained polymeric compositions at elevated temperatures and pressures to form insoluble, infusible polymeric materials.

DETAILED DESCRIPTION OF THE INVENTION

In the homopolymerization process of this invention when starting with an aliphatic polynitrile, such as a dinitrile, the reaction is one of trimerization to form trazine rings. The general polymeric structure of the polymeric compositions of this invention is shown below where $R_1$, $R_2$ and $R_3$ may be the same or different alkylene radicals and where $n$ represents the number of units of the polymer.

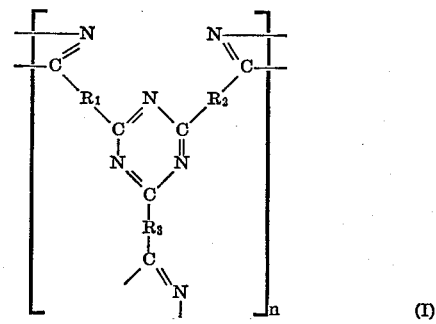

(I)

The triazine rings formed in the initial polymerization step can be linked together in a number of patterns. For example, one possible pattern for the polymers prepared by utilizing the process of this invention is shown below as Formula (II) where R is an alkylene group:

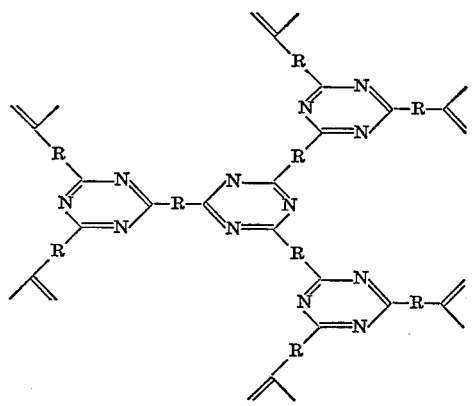

(II)

The physical properties of the polymeric materials of this invention are believed to be determined by the relative amounts of the various triazine polymers formed during the polymerization reaction.

The process of this invention is applicable to the polymerization of a wide variety of aliphatic polynitriles including aliphatic dinitriles, trinitriles, etc. to form partially polymerized products as well as fully cured, infusible, insoluble, polymeric products. Usually, the aliphatic polynitriles employed will have not over 100 carbon atoms and, preferably, not over 35 carbon atoms.

Aliphatic polynitriles useful as starting materials in the process of this invention include compounds of the formula:

NC—R—CN, where R is an alkylene radical having from 1 to about 50 carbon atoms and, preferably, from 1 to about 20 carbon atoms. Particularly useful polynitriles include those that have an alkylene chain of from 1 to 8 carbon atoms between the nitrile groups. The carbon atoms in the alkylene chain between the nitrile groups may be substituted with other innocuous groups, such as alkyl of from 1 to 10 carbon atoms as exemplified by methyl, ethyl, propyl, heptyl, octyl and isomers thereof, amino, nitro, hydroxyl, carboxyl and halogen selected from the group consisting of chlorine, fluorine, iodine, and bromine.

Particularly valuable polymers are prepared by the process of this invention when polynitriles of the formula:

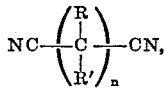

wherein $n$ is an integer of from 1 to 8 inclusive and in each

unit R and R' are independently selected from the group consisting of hydrogen, alkyl of from 1 to 10 inclusive carbon atoms, as exemplified by methyl, ethyl, propyl, butyl, hexyl, heptyl, decyl, and isomers thereof, amino, nitro, hydroxy, carboxy and halogen selected from the group consisting of chlorine, fluorine, bromine and iodine, are utilized as starting materials.

Another particularly preferred group of starting materials for use in the present process includes compounds of the formula:

where $n$ is an integer of from 1 to 5. Examples of materials of this group include malonitrile, succinonitrile, glutaronitrile, adiponitrile and pimelonitrile.

Examples of aliphatic polynitriles suitable for use in the process of this invention include:

2-bromomalononitrile
2-iodomalononitrile
2-aminomalononitrile
2-nitromalononitrile
2,2-dichloromalononitrile
2-hydroxymalononitrile
2-n-heptylmalononitrile
2-methyl-2-ethylmalononitrile
2-ethylsuccinonitrile
2-bromosuccinonitrile
2-fluorosuccinonitrile
2-n-octylsuccinonitrile
2-carboxylsuccinonitrile
2,3-dimethylsuccinonitrile
2,3-dinitrosuccinonitrile
2,3-diaminosuccinonitrile
2,3-dihydroxysuccinonitrile
2,3-dimethyl-2,3-diethylsuccinonitrile
2,3,3-trimethylsuccinonitrile
2,3,3-trihexylsuccinonitrile
2,2,3,3-tetramethylsuccinonitrile
2,2,3,3-tetraisobutylsuccinonitrile
2,3-difluoro-2,3-di-tert-butylsuccinonitrile
2-(chloromethyl)-succinonitrile
1,2,2-tricyanoethane
1,1,2,2-tetracyanoethane
perfluorosuccinonitrile
perchlorosuccinonitrile
2-carboxylglutaronitrile
3-aminoglutaronitrile
3-nitroglutaronitrile
2,3-dimethylglutaronitrile
2,3-dinitroglutaronitrile
2,2-dihydroglutaronitrile
2,3-dichloro-4-methylglutaronitrile
2,3-dihydroxyglutaronitrile
2,3,4-tribromoglutaronitrile
2,3,4-triisopropylglutaronitrile
2,2,3,3-tetrafluorglutaronitrile
2,3-dicarboxyglutaronitrile
perfluoroglutaronitrile
3-chloroadiponitrile
4-aminodiponitrile
4-nitroadiponitrile
3-fluoroadiponitrile
2,2,3-tricyanopropane
2-hydroxyadiponitrile
2-isopropyladiponitrile
1,3-dibromoadiponitrile
2,4-dihydroxyadiponitrile
2,3,4-triethyladiponitrile
2,2,3-trihydroxyadiponitrile
2,3-dichloro-3,4-di-isobutyladiponitrile
2,2,3,3-tetrachloroadiponitrile
perchloroadiponitrile
perfluoroadiponitrile Derivatives of pimelonitrile, suberonitrile, sebaconitrile, etc. of the same general types as set forth above are also suitable starting materials in the process of this invention.

Mixtures of the above-mentioned aliphatic polynitriles, such as a mixture of succinonitrile and perfluorosuccinonitrile may be employed if desired. In addition to the examples above, other substituted aliphatic polynitriles can be employed. For example, those containing groups derived from a carboxyl group, such as carboxylic salts, amides and esters thereof, as well as nitrosulfone and sulfonic acid groups. Preparation of the above-described aliphatic nitriles can be accomplished by methods well known in the art. For example, halogenated derivatives of the various aliphatic nitriles can be made by the methods described in U.S. Pats. 3,502,579 and 3,317,484, etc.

POLYMERIZATION CONDITIONS

The temperature at which the polymerization reaction of this invention is carried out can be varied widely although generally the temperature utilized will be from about 80 to about 450° C. and, preferably, will be from about 150 to about 400° C. A wide variety of products result which are, in general, solids at room temperature but at elevated temperatures range from highly fluid to viscous and to rigid, infusible polymeric materials. Among the products which can be made are partially cured thermoplastic compositions which, in this specification, are referred to as B-stage resins. Such compositions can be conveniently cured under the influence of heat or heat and pressure to yield rigid, infusible, insoluble compositions.

The products formed in the early stages of this process are at elevated temperatures highly fluid, liquid polymers and as the polymerization continues they become soft materials and finally rigid, infusible, insoluble polymeric products result. The final products, i.e., the completely cured compositions, are presumably highly crosslinked materials. The products of this invention are extremely insoluble materials which exhibit negligible solubility in organic liquids, such as ethers, ketones and aromatic hydrocarbons, such as ethyl-n-propyl ether, methyl isobutyl ketone, diethyl ether, N-methyl-2-pyrrolidone, decalin, p-chlorobenzene, o-chlorobenzene, bromobenzene, aniline, and toluene.

The amount of catalyst employed in preparing the curable compositions of this invention can be varied widely. Generally, from about 0.1 to about 5 weight percent of the catalyst based on the weight of the monomer charged to the reactor will be utilized although, preferably, this amount will be from about 0.5 to about 3.5 weight percent on the same basis.

A wide variety of catalysts may be utilized in conducting the process of this invention. Useful catalysts include:

(A) Compounds of non-metals, such as phosphorus pentoxide, non-metal halides, such as phosphorus trichloride, phosphorus tribromide, phosphorus triiodide, phosphorus pentachloride, phosphorus pentabromide, arsenic tribromide, arsenic triiodide and arsenic trichloride;

(B) Acids such as sulfuric acid, hydrochloric acid, hydrofluoric acid, fluosulfonic acid chlorosulfonic acid, etc.; and (C) Halides of metals of Groups II, III, IV, V and VIII of the Periodic Table as set forth on page 125 of Mellor's Modern Inorganic Chemistry, Revised Edition, Longmans, Green and Co. Ltd. (1967), such as zinc chloride, aluminum chloride, aluminum iodide, aluminum bromide, ferric chloride, titanium tetrachloride, antimony trichloride, antimony trifluoride, antimony triiodide, boron trichloride, boron trifluoride, arsenic chloride, cuprous chloride, cobalt bromide, vanadium tetrafluoride, manganous bromide, manganic chloride, strontium fluoride, strontium chloride, zirconinum tetriodide, zirconium tetrachloride, stannous chloride, and stannic iodide.

A highly important facet of this invention is that after the conversion operation has been completed the unreacted nitrile may be removed overhead from the reaction mixture by sublimation, leaving as bottoms the trimer which is available for further polymerization to a B-stage (partially cured) polymer and to the fully cured polymeric product. The sublimation scheme can be applied by purification of the polymeric product whether the polymerization is carried out at atmospheric or at high pressures.

The catalyst may be removed from the curable compositions of this invention, if desired, or it may be left in the product and the final curing of the composition completed in the usual manner under the influence of heat alone or under heat and pressure. Prior to the final curing operation removal of the catalyst can be accomplished by a variety of methods. If a volatile catalyst, such as ferric chloride, titanium tetrachloride, aluminum chloride, antimony trichloride, antimony pentachloride, arsenic trichloride, arsenic pentachloride, boron trichloride, phosphorus trichloride, phosphorus pentachloride, stannic chloride, vanadium tetrachloride, or zirconium tetrachloride is employed in the polymerization reaction it can be conveniently removed from the reaction mixture along with unreacted polynitrile monomer by sublimation. Non-volatile catalysts, such as zinc chloride, phosphorus pentoxide, strontium dichloride, etc., as well as the volatile catalysts previously mentioned can be removed from the curable compositions by solvent extraction with, for example, acetone, xylene, methanol, ethanol, diethyl ether or acetonitrile, etc. In addition, the non-volatile catalysts previously enumerated above can be removed by a water wash.

The polymeric compositions of this invention can be cured to form a variety of products ranging from materials which are highly viscous liquids at elevated temperatures to completely cured, hard, rigid, infusible solids. Such completely cured materials possess remarkable physical properties. For example, the completely cured products after being heated for as long as 5½ hours at 320° C. in air show a negligible weight loss and exhibit no oxidation effects.

Likewise, these same polymeric materials can be heated in the absence of air to 475° C. for 5 hours or more with no visible change taking place and the strength may be improved thereby. The polymers of this invention, including the B-stage resins previously mentioned, can be cured by heating to a temperature of about 125 to about 500° C. for a period of about 10 minutes to about 10 hours or more. Generally, curing is conducted under the influence of both heat and pressure. Temperatures of about 125 to about 500° C. and, preferably, from about 150 to about 350° C. are used while the pressure is maintained at from about zero to about 10,000 p.s.i. for a period of time ranging from about 10 minutes to about 10 hours or more. The completely cured products exhibit flexural strengths of from about 2000 to about 30,000 p.s.i. or more and compressive strengths of about 4000 to about 85,000 p.s.i. or more. The densities of the completely cured products range from about 1.20 to about 1.40 or more.

Under certain conditions polymerization of the aliphatic polynitriles is very difficult to control. Runaway reactions sometimes occur with the result that copious amounts of ammonia are evolved and the resulting polymeric product is an infusible, cured material (i.e., it cannot be melted or mold-cured to a finished product).

It has been found that the polymerization reaction can be moderated by conducting it in the presence of an inert carrier, such as a paraffin hydrocarbon as exemplified by heptane, octane, isooctane, decane, isodecane, undecane, tridecane, etc. ethylene glycol, 1,2,3,4-tetrahydronapthalene, biphenyl, etc. Preferably, the boiling point of the liquid carrier will be between about 80 and 450° C. Generally, the carrier employed is one in which the aliphatic polynitrile is essentially insoluble. Carrier liquids, such as ethylene glycol, in which some of the monomers are soluble can also be utilized, if desired. When employing a liquid carrier in the process of this invention, the reactor is operated under sufficient pressure so that the carrier remains in the liquid state or the pressure of the reactor is selected so that the carrier is allowed to boil and reflux.

When a carrier liquid is used in the process of this invention it is found that the dinitrile dispersed in the carrier liquid is heated more uniformly since heat from the reactor wall is more easily transferred to the carrier and then to the monomer. Another advantage of this method is that the use of the carrier tends to minimize agglomerization of the formed polymer which might otherwise cause local overheating due to the exothermic nature of the polymerization reaction and the carrier serves to distribute or disperse the heat generated during the reaction.

Aromatic mononitriles, such as benzonitrile, o-toluonitrile, n-toluonitrile, p-toluonitrile, 2-napthonitrile, phenylbenzonitrile, p-t-butylbenzonitrile, p-chlorobenzonitrile, m-fluorobenzonitrile, 2,4 - dichlorbenzonitrile, p-bromobenzonitrile, etc. and aliphatic mononitriles, such as acetonitrile, propionitrile, n - butyronitrile, isobutyronitrile, n-amylnitrile, isoamylnitrile, etc. and mixtures thereof, may be added to the polymerization reaction mixture, if desired. Such mononitriles serve to moderate the polymerization reaction and to control the molecular weight of the resulting polymeric products. Generally from about 0.1 to about 25 weight percent of the mononitriles based on the weight of the aromatic polynitrile or mixtures thereof charged to the reactor will be used.

Prior to the curing operation a wide variety of fillers and reinforcing agents can be added to the curable polymeric compositions of this invention. Illustrative of the many fillers which can be utilized with the compositions of the present invention are titanium dioxide, lithopone, zinc oxide, lead oxide, alumina, zirconium silicate, iron oxide, diatomaceous earth, calcium carbonate, silica, fumed silica, precipitated silica, glass fibers, magnesium oxide, crushed quartz, calcined clay, asbestos, carbon, carbon fibers, graphite, petroleum coke, kilned wood flour, synthetic fibers, etc. Usually from about 5 to about 1000 parts of filler or reinforcement per 100 parts of the curable polymeric composition are added.

B-STAGE POLYMERIC COMPOSITIONS

The B-stage polymeric compositions previously referred to represent particularly useful materials in that they can be conveniently molded into rod, sheet, tubing, etc. Such B-stage resins are defined herein as curable polymeric compositions of this invention which have been polymerized to the extent that they are partially cured and quite stable for extended periods of time. They represent relatively low molecular weight thermoplastic polymers which are solid at room temperature and which are capable of being cured to yield infusible, insoluble polymeric compositions (i.e. "C-stage" compositions).

Curing of the B-stage compositions can be conducted in the same manner as previously set forth above for the curable polymeric compositions of this invention, that is, at a temperature of about 125 to about 500° C. under a pressure ranging from about 100 to about 10,000 p.s.i. and for a period of time of about 10 minutes to about 10 hours or more. The temperature, pressure and period of heating selected in the curing operation will depend on the particular aliphatic nitrile, catalyst, etc. used in making the B-stage composition.

The B-stage polymeric compositions are prepared in the same manner as utilized in preparing the other curable polymeric compositions of this invention. Any of the aliphatic polynitriles including the aliphatic dinitriles, trinitriles, etc. may be employed. Generally, the B-stage polymeric compositions are prepared by heating an aliphatic polynitrile or mixtures of these nitriles with a suitable catalyst at a temperature of about 80 to about 450° C. for a period of about 0.5 to 6 hours. Removal of unreacted nitrile monomer as well as of the catalyst, if desired, can be accomplished by the procedures set forth under "Polymerization Conditions" above.

The B-stage resins of this invention can be ground to form molding powders having a mesh size of about 20 to about 400 or finer. Such grinding operations can be conveniently conducted using a ball mill or any other suitable grinding equipment.

An A-stage polymer is defined herein as a relatively low molecular weight polymeric composition of this invention which is a highly fluid material in the molten state at an elevated temperature. Such A-stage products can, of course, be further polymerized to B-stage materials and they may also be cured under the same conditions, as previously set forth, to form the final cured infusible, insoluble polymeric products.

In preparing B-stage polymers, it is necessary to stop the polymerization and curing action before the C-stage is reached. At higher polymerization temperatures care must be exercised that the time of polymerization is not extended to the point that a C-stage material results. Likewise, at lower polymerization temperatures the heating time required to arrive at the B-stage will be longer and it is possible to exercise more control. By checking the viscosity of the polymerization mixture periodically one can avoid formation of an insoluble, infusible C-stage product. One way of obtaining an indication of the approximate time required to arrive at the B-stage is to first conduct the polymerization reaction on a small scale.

The polymeric products of this invention are useful in a wide variety of applications, such as for bushings, molded articles, etc., especially where the ability to withstand elevated temperatures is required. The completely cured compositions can be machined to produce a variety of parts, such as housings, liners of impellers for pumps useful in handling a number of organic liquids, such as alcohols, ketones, ethers, amines, etc. When compounded with glass fibers, asbestos, etc., the B-stage resins can be molded and cured to form, for example, duct work for use in chemical exhaust systems and for the preparation of solvent-resistant pipe useful for handling acetone, methyl alcohol, diethylamine and corrosive gases such as chlorine, etc.

The following examples illustrate various embodiments of this invention and are to be considered not limitative.

EXAMPLE I

A total of 12.2895 g. of succinonitrile was added to a flask and heated until molten. Zinc chloride in the amount of 0.2447 g. was added to the molten dinitrile with stirring and the stirring action was continued until the catalyst had dissolved. The resulting solution was allowed to solidify and portions were added to two steel polymerization tubes which were evacuated to remove air, backfilled with nitrogen and then sealed. The charged weight of succinonitrile with accompanying zinc chloride placed in Tube A was 4.3300 g. and in Tube B, 4.5095 g. The tubes were heated to 200° C. for 87 minutes, cooled and the polymerized material removed. A portion of the polymeric product from Tube A was heated gently over a small flame and the resulting molten material was quite fluid. Infrared analysis of this product indicated that the material contained some unconverted succinonitrile monomer (melting point about 54° C.).

In the next operation the unconverted succinonitrile monomer was removed by sublimation at reduced pressure from the initially prepared polymeric product. Portions of the material from Tubes A and B were combined and 7.5807 g. of the mixture was placed in a flask fitted with a magnetic stirring bar, an air condenser and attached to a vacuum pump. The flask was immersed in a silicone oil heating bath and the temperature raised to 175° C. over a period of 37 minutes and at this point (under 36 mm. Hg pressure) the sample appeared to boil slightly. Some refluxing was observed at 185° C. bath temperature (30 mm. Hg). The sample was maintained at 200° C. under 29 mm. Hg for 20 minutes, after which the flask was removed from the bath, cooled and placed in a desiccator. The weight of the material removed by sublimation was 0.3019 g.

The resulting B-stage product was submitted for elemental analysis and the following results obtained:

|  | C | H | N |
|---|---|---|---|
| Theoretical ($C_4H_4N_2$) | 59.99 | 5.03 | 34.98 |
| Tube A | 60.09 | 4.77 | 35.14 |
| Tube B | 60.01 | 4.82 | 35.17 |
| Combined material after sublimation | 60.83 | 4.82 | 34.34 |

Infrared analysis indicated that the succinonitrile had been largely eliminated by the sublimation treatment. A sample of the thus-treated B-stage product was added to a test tube and the melted material was a viscous polymeric composition.

A portion of the combined material, after sublimation, was put in a ⅛ inch I.D. steel mold and a pellet of ⅛ inch O.D. diameter and about 10.6 mm. in length was prepared. The mold-curing (i.e., preparation of the solid pellet) was conducted at 260° C. for 1.42 hours under an applied pressure of 2850 p.s.i. The resulting pellet, which was easily removed from the mold, was black with a smooth, shiny appearance. On testing, the pellet exhibited a compressive strength of 39,310 p.s.i. and flexure (short beam shear) of 21,330 p.s.i. The density of the pellet was 1.35 g./cc. In the flexure test the pellet was suspended between rods 0.35 inch apart and a round nose or rod was impressed at right angles on the center of the suspended specimen until the force applied caused the pellet to break.

EXAMPLE II

Succinonitrile in the amount of 9.7369 g. was melted and 0.1946 g. of zinc chloride was dissolved therein, after which time the mixture was allowed to cool. A portion of the resulting mixture was placed in a stainless steel polymerization tube which was evacuated to remove air, flushed with nitrogen and sealed. The tube and contents were heated for 1.5 hours at 200° C. and, after cooling, the tube was opened. A trace of ammonia was detectable at that time. The polymeric material (i.e., the B-stage polymer) was removed from the tube and a portion was submitted for elemental analysis. The results obtained are set forth below:

|  | C | H | N |
|---|---|---|---|
| Theoretical ($C_4H_4N_2$) | 59.99 | 5.03 | 34.98 |
| B-stage material | 60.04 | 5.03 | 34.93 |

Infrared analysis showed that a triazine polymer had been formed and that the structure was in agreement with that shown in Formula (I) above. A major triazine peak was found at about 1545 cm.$^{-1}$, a small diminished nitrile peak of 2250-cm.$^{-1}$, and also the presence of some unconverted succinonitrile was indicated.

The B-stage polymeric material previously prepared was mold-cured in a small steel mold having ⅛ inch I.D. The curing process was carried out at a pressure of 2850 p.s.i. and a temperature of 200° C. for 2 hours followed by a final cure at 300° C. for ½ hour. The resulting pellet which was ⅛ inch O.D. by about ½ inch in length was tested for compressive strength and it was found that there was no failure at 53,800 p.s.i., although it did undergo plastic deformation and showed an elastic limit of about 39,500 p.s.i.

EXAMPLE III

Glutaronitrile (1.5051 g.) and zinc chloride (0.0440 g.) were placed in a stainless steel polymerization tube, the materials were frozen in a dry ice acetone bath and the tube was evacuated, purged with nitrogen and sealed. The tube and contents were heated for 2 hours at 300° and after cooling the tube was opened, at which time the odor of ammonia was apparent. The hard polymeric material resulting was removed and ground to a powder. A portion of the crude polymeric product (0.8813 g.) was washed with cold and then with hot benzene. The insoluble residue resulting was washed with cold and hot acetonitrile and finally was extracted on a Soxhlet apparatus with acetonitrile. The thus-obtained B-stage polmeric material (0.6311 g.) was mold-cured in a ⅛ inch I.D. steel mold at 350° C. under a pressure of 2850 p.s.i. for 1.75 hours. The resulting ⅛ inch pellet was found to have a compressive strength of 10,030 p.s.i. while the pellet density was 1.33 g./cc. By infrared analysis it was determined that the structure of the polymer was in agreement with Formula (I) above.

EXAMPLE IV

Succinonitrile (250.0 g.) was melted in a reactor vessel, 5.0 g. of zinc chloride was added to serve as catalyst and finally 300 ml. of n-undecane (boiling point 196° C.) was added to the reactor. The reactor vessel was attached to the reactor head which was fitted with a refluxing condenser and a stirring device. The stirrer was started and the reactor was immersed in a hot silicone oil bath. The temperature of the reactor was raised over a period of 28 minutes until refluxing of the carrier liquid commenced (temperature 194° C.). This reaction temperature was maintained essentially constant throughout the run by the refluxing of the carrier while the rate of refluxing was maintained by adjustment of the external heating bath. Some ammonia effluent from the reactor was observed. After a reaction time of 35 minutes, the silicone oil heating bath was removed, the reactor was cooled down with water and the crude product and undecane removed.

In order to remove unreacted succinonitrile from the polymerized product it was treated with benzene. A portion of the crude product was removed from the undecane in which it was insoluble and washed by decantation several times in a total of 208 ml. of petroleum ether to remove final trace of the higher boiling undecane, following which the product was vacuum dried at 32° C. for 1 hour. The thus-obtained dried material (24.9343 g.) was thoroughly mixed with 50 ml. of benzene at room temperature, and decanted through a glass filter. This washing step was repeated two more times and then in a final step the product was washed with 60 ml. of hot benzene (65° C.) and decanted as before. In a final step several portions of benzene totaling 125 ml. were employed to wash the crude product at room temperature, after which it was dried in a vacuum oven at 50° C. to give the final purified B-stage product (weight 7.8680 g.—31.6% yield from the crude product).

A portion of the thus-purified polymeric material was ground to a powder and placed in a small steel mold following which the material was cured at 255° C. for 1.5 hours under a pressure of 2850 p.s.i. The resulting pellet, which was ⅛ inch in O.D. by about ½ inch in length, was black with a shiny, smooth appearance. The flexure strength (short beam shear) was measured as in the previous examples and found to be 16,320 p.s.i., while the compressive strength was 50,200 p.s.i.

EXAMPLE V

In this example the reactor, equipped with a stirrer, a pressure gauge, two valved outlets and a thermometer, was charged with 150 g. of succinonitrile together with 3 g. of zinc chloride which had been dissolved in the dinitrile. There was also added to the reactor 207.6 g. of n-dodecane to serve as a carrier liquid. Heating was initiated by means of a silicone oil bath in which the reactor was immersed. The bath was preheaed at 250° C. and then raised up around the reactor to bring the temperature up to 200° C. as quickly as possible. Stirring was commenced as soon as the succinonitrile had melted. The reaction temperature rose smoothly to 198° C. over a 26 minute period. With continued stirring the reaction temperature rose to a maximum of 210° C. at which time the evolution of ammonia was observed. At the end of 19 minutes the reactor was removed from the heating bath and cooled. The maximum pressure reacted in the reactor was 20 p.s.i. which promptly fell to zero after cooling was started.

After the reactor had cooled, the dodecane was decanted off and the B-stage material recovered was removed and washed by decantation 3 times with petroleum ether in order to remove residual dodecane, following which the material was dried in a vacuum oven. Infrared analysis of the resulting polymeric product indicated that a substantial yield of triazine material with a residual nitrile peak had been achieved and that some unconverted succinonitrile was also present.

The crude polymeric product (155 g.) containing a trace of petroleum ether was extracted several times by decantation with benzene (total volume employed—675 ml.) at room temperature in order to remove unreacted succinonitrile. The resulting polymeric product was dried in a vacuum oven at a maximum temperature of 74° C., and the thus-obtained B-stage product was broken up and ground to yield 97.2 g. of a soft powder. The product was submitted for elemental analysis and the following results were obtained.

| | C | H | N |
|---|---|---|---|
| Theoretical ($C_4H_4N_2$) | 59.99 | 5.03 | 34.98 |
| Benzene insoluble material (B-stage product) | 61.42 | 4.86 | 33.72 |

Residual zinc chloride was determined and found to be 1.71 weight percent. Infrared analysis indicated a strong triazine peak at 1545 cm.$^{-1}$, a strong but diminished nitrile peak at about 2250 cm.$^{-1}$ and only a trace of succinonitrile. The analysis also showed that the structure was in agreement with Formula (I) shown above.

The B-stage product was mold-cured at 260° C. for 1.6 hours under a pressure of 2850 p.s.i. and the ⅛ inch O.D. diameter pellet resulting was of excellent appearance. Density of the pellet was found to be 1.35 g./cc. and the flexure strength (short beam shear) measured as in the previous examples was 21,510 p.s.i. while the compressive strength was 73,510 p.s.i.

EXAMPLE VI

Zinc chloride in the amount of 0.3159 g. was added to 15.7741 g. of molten succinonitrile and the mixture stirred thoroughly until cool. Portions of this mixture were placed in three stainless steel tubes which were evacuated, purged with nitrogen, sealed and heated for various times at 200° C. in an oven. Tube A was heated for 87 minutes at 200° C. and, after being cooled, the resulting B-stage material was removed from the tube and a portion was mixed with ground petroleum coke (passed through a 140 mesh sieve). The B-stage polymer previously prepared (0.9058 g.) was carefully melted and coke powder (0.3890 g.), mixed in and thoroughly stirred until the mixture was cool. A portion of this material was placed in a ⅛ inch I.D. steel mold and cured at 260° C. for 1.58 hours under a pressure of 2850 p.s.i. The pellet, which was easily removed from the mold, had a good, smooth appearance. The compressive strength was measured and found to be 27,700 p.s.i., while the flexural strength (short beam shear) measured as in the previous examples was 11,000 p.s.i. Pellet density was 1.32 g./cc.

EXAMPLE VII

Pine sawdust (approx. 4 g.) was heated in a reaction flask immersed in hot oil (200° C.) for 1.75 hours under a slow stream of nitrogen to carry out the volatiles. The resulting material, after cooling, was ground, passed through a 400 mesh sieve and heated to a wood temperature of 205–235° C. for 4 hours. A mixture was prepared with molten succinonitrile (1.1882 g.), zinc chloride (0.0387 g.) and 0.3874 g. of the previously prepared, dried kilned wood flour. The mixture was stirred continuously until cool, yielding a granular, hard, waxy blend. A portion of this blend was mold-cured in a ⅛ inch I.D. steel mold under a pressure of 2,850 p.s.i. and at 200° C. for 8.75 hours. The pellet, which was easily removed, was found to have a compressive strength of 30,880 p.s.i. (density 1.38 g./cc.).

EXAMPLE VIII

Succinonitrile (1.0198 g.) was melted and zinc chloride (0.0215 g.) and Cab-O-Sil (0.0897 g.) were added with stirring until a uniform material was formed. Cab-O-Sil is the trade name for a finely divided fumed silica manufactured by the Cabot Corporation, Boston, Mass.

The mixture was allowed to cool until solidified. A portion of this material was placed in a ⅛ inch I.D. steel mold and mold-cured for 2.38 hours at 260° C. under a pressure of 2850 p.s.i. The resulting pellet exhxibited a density of 1.37 g./cc. and a compressive strength of 25,050 p.s.i.

What is claimed is:

1. A curable polymeric product comprising recurring triazine rings linked together through alkylene groups joined to the carbon atoms of the said triazine rings wherein the said alkylene groups have the formula:

and wherein $n$ is an integer of from 1 to 8 inclusive and in each

unit R and R are selected from the group consisting of hydrogen, alkyl of from 1 to 10 inclusive carbon atoms, amino, nitro, hydroxyl and carboxyl, and wherein the said product contains from about 5 to about 1000 parts of a reinforcing agent per 100 parts of the said curable composition.

2. The curable polymeric product of claim 1 wherein the said alkylene groups have the formula:

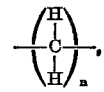

wherein $n$ is an integer of from 1 to 15 inclusive.

3. The curable polymeric product of claim 2 wherein the said reinforcing agent is selected from the group consisting of silica, petroleum coke and kilned wood flour.

4. The product of claim 2 wherein the said reinforcing agent is silica.

5. The product of claim 2 wherein the said reinforcing agent is petroleum coke.

6. The product of claim 2 wherein the said reinforcing agent is kilned wood flour.

7. The curable polymeric product of claim 2 wherein the said product contains from about 0.1 to about 5 weight percent of a catalyst selected from the group consisting of the halides of aluminum, antimony, boron, strontium, zirconium and tin.

8. The curable polymeric product of claim 2 wherein the said product is a thermoplastic solid at room temperature capable of being cured under the influence of heat and pressure to form an infusible polymeric composition.

9. A molding powder prepared by grinding the product of claim 2.

References Cited
UNITED STATES PATENTS
3,317,484  5/1967  Fritz _____ 260—78.4

OTHER REFERENCES
Chem. Absts., Vol 68:33663K—"Polymerization of Dinitriles," Iwakura et al.

WILLIAM H. SHORT, Primary Examiner
E. WOODBERRY, Assistant Examiner

U.S. Cl. X.R.
260—37 N, 37 R